United States Patent
Date et al.

(10) Patent No.: US 7,252,069 B2
(45) Date of Patent: Aug. 7, 2007

(54) GAS FUEL ENGINE AND CONTROL METHOD FOR THE SAME

(75) Inventors: Kenji Date, Obu (JP); Masaaki Kato, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/288,080

(22) Filed: Nov. 29, 2005

(65) Prior Publication Data

US 2006/0112926 A1 Jun. 1, 2006

(30) Foreign Application Priority Data

Nov. 30, 2004 (JP) .............................. 2004-346738
Jul. 4, 2005 (JP) .............................. 2005-195377

(51) Int. Cl.
*F02D 41/40* (2006.01)

(52) U.S. Cl. ......................................... 123/299; 123/37

(58) Field of Classification Search .................. 123/37, 123/299, 300, 431
See application file for complete search history.

(56) References Cited

U.S. PATENT DOCUMENTS

| | | | |
|---|---|---|---|
| 4,621,599 A | 11/1986 | Igashira et al. | ............. 123/300 |
| 5,271,359 A | 12/1993 | Teramoto et al. | ........... 123/432 |
| 5,392,740 A | 2/1995 | Teramoto et al. | ............... 123/3 |
| 5,413,075 A | 5/1995 | Mamiya et al. | ............. 123/431 |
| 5,460,128 A * | 10/1995 | Kruse | ......................... 123/299 |
| 5,609,131 A * | 3/1997 | Gray et al. | .................. 123/299 |
| 6,609,493 B2 * | 8/2003 | Yamaguchi et al. | ......... 123/299 |
| 6,622,690 B2 * | 9/2003 | Ando et al. | ..................... 123/37 |
| 6,659,071 B2 * | 12/2003 | LaPointe et al. | ............. 123/299 |
| 6,684,852 B2 * | 2/2004 | Wright et al. | ................ 123/431 |
| 6,712,036 B1 * | 3/2004 | Andersson et al. | ......... 123/299 |

FOREIGN PATENT DOCUMENTS

JP            2004-76686       3/2004

\* cited by examiner

*Primary Examiner*—T. M. Argenbright
(74) *Attorney, Agent, or Firm*—Nixon & Vanderhye P.C.

(57) ABSTRACT

In a gas fuel engine, a first air-fuel mixture having a local excess air factor λ not less than 2 is combusted (a first combustion). When a target torque is not sufficiently obtained by the first combustion, a fuel is directly injected into a combustion chamber to form a second air-fuel mixture having a local excess air factor λ less than 1.1, so that a second combustion is performed. The combustion of the air-fuel mixture is switched from the first combustion to the second combustion in one combustion stroke.

11 Claims, 12 Drawing Sheets

GAS FUEL ENGINE AND CONTROL METHOD FOR THE SAME

CROSS-REFERENCE TO RELATED APPLICATION

This application is based on Japanese Patent Application No. 2004-346738 filed on Nov. 30, 2004 and No. 2005-195377 filed on Jul. 4, 2005, disclosures of which are incorporated herein by reference.

FIELD OF THE INVENTION

The present invention relates to a gas fuel engine which is operated with gas fuel, such as hydrogen gas and CNG (Compressed Natural Gas), and more particularly relates to a control method for controlling an air-fuel ratio (an excess air factor) of an air-fuel mixture to be combusted by the engine.

The excess air factor is calculated by dividing "an actual air-fuel ratio" by "a theoretical air-fuel ratio", and the excess air factor $\lambda$ is regarded as "1", when the air-fuel mixture is completely combusted. Accordingly, the excess air factor $\lambda$ is increased, as the air amount relative to the fuel becomes larger.

In the specification, "a local excess air factor" means an excess air factor of an air-fuel mixture locally existing in a combustion chamber (a cylinder), whereas "an average excess air factor" means an excess air factor of an air-fuel mixture existing in an entire space of the combustion chamber (the cylinder), namely an excess air factor of fuel and air to be supplied into the combustion chamber (the cylinder).

BACKGROUND OF THE INVENTION

The local excess air factor and the average excess air factor are further explained with reference to FIGS. 12A and 12B.

When air in a combustion chamber (a total air in a cylinder) is defined as "A", air forming an air-fuel mixture is defined as "B", and fuel forming the air-fuel mixture is defined as "C", then the local excess air factor is represented by "(B/C)/$\lambda$", whereas the average excess air factor is represented by "(A/C)/$\lambda$", wherein A includes B.

It is important for the gas fuel engine operating with hydrogen to reduce production of NOx.

Prior arts for reducing NOx are disclosed, for example, in Japanese Unexamined Patent Publications No. H5-118253, No. H6-241077, and No. 2004-76686, as well as Japanese Examined Publication No. H4-37264B.

Japanese Unexamined Patent Publication No. H5-118253 discloses a technology that an operating area of an engine is restricted to such an area, in which the local excess air factor $\lambda$ is not less than 2, since this prior art makes use of a fact that almost no NOx is produced in the area of the local excess air factor $\lambda$ not less than 2.

However, if the operating area of the engine is restricted to the above area, an output power from the engine would be insufficient. Therefore, when the engine of this kind is used for a hybrid car, an electric motor is used for supplement a necessary driving power which would not be obtained by the output of the engine alone. And the engine of this kind may not be applied for a motor vehicle, by itself, due to lack of the output power.

Japanese Unexamined Patent Publication No. H6-241077 discloses a technology that a mixture of fuel and air is formed by a pre-mixture forming or a direct fuel injection, wherein the pre-mixture forming and the direct fuel injection is switched from one to the other depending on the average excess air factor $\lambda$, namely depending on whether the average excess air factor $\lambda$ is higher or lower than a predetermined local excess air factor $\lambda 0$ (1<$\lambda 0$<2, see FIG. 2), so that production of NOx is reduced.

However, the operating area at or around the excess air factor $\lambda 0$ is the operating area, in which a larger amount of NOx is produced. Accordingly, the production of NOx can not be sufficiently reduced either by the pre-mixture forming or the direct fuel injection.

Japanese Unexamined Patent Publication No. 2004-76686 discloses a technology that the average excess air factor $\lambda$ is temporally controlled to be lower than 1 ($\lambda$<1) when an accumulated amount of NOx in a NOx catalyst exceeds a predetermined value, so that the accumulated NOx is deoxidized and exhausted from the engine.

However, in the case that NOx is accumulated quickly in the catalyst and the control of the excess air factor $\lambda$ below 1 shall be often carried out (at a shorter interval), a fuel consumption ratio is decreased, because additional fuel which would not contribute in generating engine output is used.

Japanese Examined Patent Publication No. H4-37264 discloses a technology that a combustible mixture (the mixture is surely ignited) is formed at or around a spark discharge portion (a spark gap for spark discharge) by dividing the fuel injection into multiple number of injections.

Even when the mixture can be surely ignited, the production of NOx can not be always reduced, because a rich air-fuel mixture (the local excess air factor $\lambda$ is smaller than 2) may locally but widely exist in the entire space of the combustion chamber.

SUMMARY OF THE INVENTION

The present invention is made in view of the above problems, and it is an object of the present invention to provide a gas fuel engine and a control method for the gas fuel engine, in which excess air factor $\lambda$ of the air-fuel mixture is controlled at its optimum value and thereby production of NOx is always reduced.

According to a feature of the present invention, a first injection of the fuel is carried out in a first combustion period to form a first air-fuel mixture having a local excess air factor $\lambda$ not less than 2, a second injection of the fuel is carried out in a second combustion period to form a second air-fuel mixture having a local excess air factor $\lambda$ less than 1.1, and the first injection is switched to the second injection during one cycle of the combustion stroke.

According to the above feature of the invention, production of NOx can be suppressed to a small value, because the local excess air factor $\lambda$ is more than 2 in the first combustion period, whereas the local excess air factor $\lambda$ is less than 1.1 in the second combustion period.

Furthermore, the first combustion is switched to the second combustion in one cycle of the combustion stroke, so that any combustion of air-fuel mixture having a local excess air factor $\lambda$ between 1.1 and 2 can be eliminated, in which a relatively large amount of NOx is produced.

According to another feature of the present invention, the first air-fuel mixture is ignited by a spark plug to start the combustion at such a timing, at which the local excess air factor $\lambda$ of the air-fuel mixture becomes more than 2.

According to a further feature of the present invention, the fuel for the second combustion is directly injected into a flame generated in the first combustion, to start the second combustion.

According to a further feature of the present invention, an interval of an crank angle, during which the fuel is not injected between the first and second injections, is controlled to become shorter as an engine rotational speed becomes higher, whereas the interval is controlled to become longer as the engine rotational speed becomes lower.

According to such control of the crank angle interval, a variation of time period between the first and second injections can be suppressed to a smaller value, even when the engine rotational speed is changed.

According to a still further feature of the present invention, an injection start timing of the second injection is advanced as the engine load becomes higher, whereas the injection start timing is retarded as the engine load becomes lower.

Since the torque generated at the engine largely depends on the combustion of the second combustion period, and the second combustion must be ended at a constant time point (or at a constant crank angle), the second combustion period is made longer by advancing the injection start timing, when the engine torque is increased.

According to a still further feature of the present invention, a fuel injection rate for the second injection is controlled in such a manner that the injection rate at an initial stage of the second injection is made larger than that at the end of the second injection.

According to a still further feature of the present invention, a fuel injection rate for the second injection is controlled in such a manner that the injection rate at an initial stage of the second injection is made smaller than that at the end of the second injection.

According to a still further feature of the present invention, a first injection of the fuel is carried out in a first combustion period so that a first combustion is performed in a low NOx production range of a lean side, in which air-fuel mixture having a higher local excess air factor is combusted and a smaller amount of NOx is produced, a second injection of the fuel is carried out in a second combustion period so that a second combustion is performed in a low NOx production range of a rich side, in which air-fuel mixture having a lower local excess air factor is combusted and a smaller amount of NOx is produced, and the first combustion is switched to the second combustion during one cycle of the combustion stroke.

According to such feature, the first combustion is switched to the second combustion in one cycle of the combustion stroke, so that any combustion of air-fuel mixture having a local excess air factor $\lambda$ can be eliminated, with which a relatively large amount of NOx would be produced.

BRIEF DESCRIPTION OF THE DRAWINGS

Other objects, features and advantages of the present invention will become more apparent from the following detailed description made with reference to the accompanying drawings. In the drawings.

DETAILED DESCRIPTION OF PREFERRED EMBODIMENTS

Figure 1:
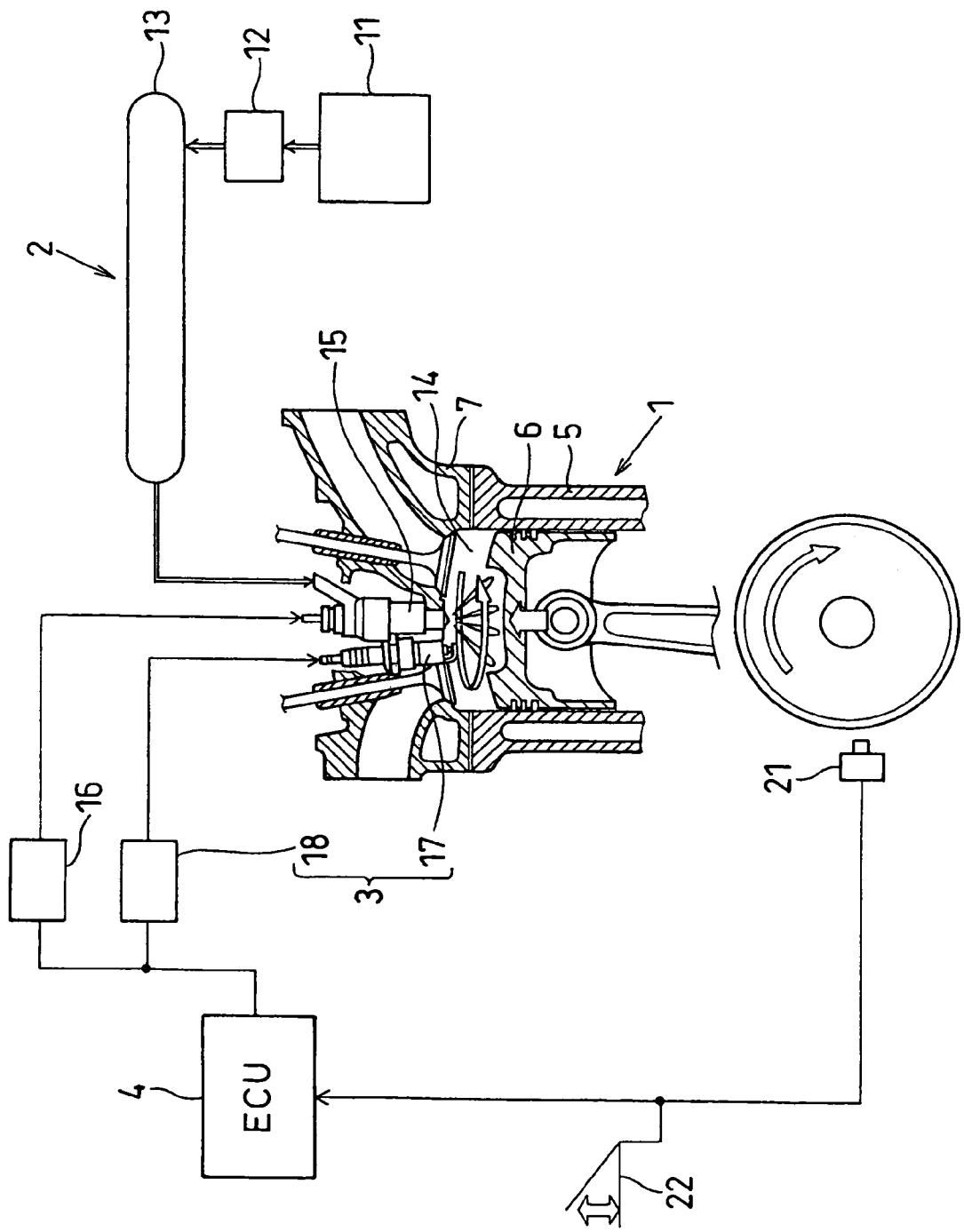
FIG. 1 is a schematic view showing a gas fuel engine according to a first embodiment.

In a gas fuel engine according to embodiments of the present invention, the engine is operated by gas fuel, and in one cycle of a combustion stroke, a first combustion period in which a first air-fuel mixture having a local excess air factor $\lambda$ more than 2 is combusted is switched to a second combustion period in which a second air-fuel mixture having a local excess air factor $\lambda$ less than 1.1 is combusted.

In another gas fuel engine according to embodiments of the present invention, the engine is operated by gas fuel, and in one cycle of a combustion stroke, a first combustion period in which a first air-fuel mixture of a low NOx production range on a lean side is combusted is switched to a second combustion period in which a second air-fuel mixture of a low NOx production range on a rich side is combusted. The air-fuel mixture of the low NOx production range on the lean side means a mixture having a higher local excess air factor $\lambda$ so that a production amount of NOx is small, whereas the air-fuel mixture of the low NOx production range on the rich side means a mixture having a lower local excess air factor $\lambda$ so that a production amount of NOx is small.

An Otto cycle engine and a Sabathe cycle engine will be at first briefly explained.

In the Otto cycle engine, which is operated with gasoline, a fuel supply into a cylinder is completed before an end of a compression stroke (before reaching at a top dead center: TDC), a mixture of air and the fuel vaporized by the compression is ignited by a spark ignition device, and a combustion of the mixture is performed by a flame propagation. Namely, the Otto cycle engine has an operational range of a constant-volume combustion, in which the combustion is performed by the flame propagation.

It is necessary for the gasoline to be vaporized for the purpose of the combustion, and the gasoline is not easily self-ignited. Accordingly, even if the gasoline is supplied during the combustion, a sufficient combustion can not be expected. As a result, unburned gas may by exhausted or an output of the engine may be decreased.

In the Sabathe cycle engine, which is operated with diesel oil, a fuel injection into the cylinder is carried out when a piston reaches at or around the top dead center of the compression stroke, the fuel is self-ignited by the compression, and a combustion of a mixture is performed depending on a speed of generating the mixture. Namely, the Sabathe cycle engine has an operational range of a constant-pressure combustion, in which the combustion is performed in response to the speed of generating the mixture.

When the diesel oil is supplied into the cylinder at an earlier timing, it may happen that the diesel oil will be attached to a side wall of the cylinder. An optimum combustion can not be obtained in the Sabathe cycle engine unless a timing of the self-ignition is properly controlled, because the combustion of mixture starts by the self-ignition of the diesel oil.

On the other hand, in case of a gas fuel engine, there is no time delay for gas fuel in its vaporization, because gas phase fuel is used in the gas fuel engine. The gas fuel (in particular, hydrogen) is hardly self-ignited, like the gasoline. Therefore, the hydrogen is considered as the fuel for the Otto cycle engine.

It is, however, problem that the engine operated with hydrogen may emit a larger amount of NOx. According to the present invention, therefore, a gas fuel engine to be operated by a complex combustion method (similar to the Sabathe cycle engine) is proposed, in which the Otto cycle engine and the Sabathe cycle engine is combined by making much use of the characteristic of the gas fuel.

First Embodiment

A first embodiment of the present invention will be described hereinafter with reference to FIGS. 1-6.

A gas fuel engine is an internal combustion engine, which burns gas fuel, such as hydrogen and CNG (Compressed Natural Gas). Though FIG. 1 discloses a single cylinder for the purpose of simplified description, the gas fuel engine may have multiple cylinders and may control an excess air factor $\lambda$ (as described later) for the respective cylinders.

The gas fuel engine shown in FIG. 1 is a direct fuel injection internal combustion engine provided with an ignition system. The gas fuel engine comprises an engine 1, a fuel injection device 2, a spark ignition device 3, and an ECU (Electronic Control Unit) 4.

The engine 1 comprises a cylinder block 5 having a cylinder, a piston 6 reciprocated in the cylinder, which is operatively linked with a crankshaft through a rod, and a cylinder head 7 closing a top of the cylinder, in which an intake port and an exhaust port are formed.

The fuel injection device 2 comprises a high pressure accumulator 11, a pressure regulating device 12, a high pressure fuel accumulating chamber 13, an injector 15, and an injector driving circuit 16. The high pressure accumulator 11 accumulates high pressure gas fuel. The pressure regulating device 12 regulates the high pressure gas fuel accumulated in the high pressure accumulator 11 at a proper pressure and outputs the gas fuel. The fuel accumulating chamber 13 accumulates the gas fuel, the pressure of which is regulated by the pressure regulating device 12. The injector 15 is arranged at the cylinder head 7 and directly injects the gas fuel accumulated in the fuel accumulating chamber 13 into a combustion chamber 14. The injector driving circuit 16 supplies the injector 15 with electric power in order to inject the gas fuel. The injector driving circuit 16 may be arranged in a case of the ECU 4.

The spark ignition device 3 comprises a spark plug 17 and a spark plug driving circuit 18. The spark plug 17 is arranged at the cylinder head 7 for igniting an air-fuel mixture locally formed around a spark discharge portion. The spark plug driving circuit 18 supplies the spark plug 17 with the electric power of high voltage for spark discharge. The spark plug driving circuit 18 may be likewise arranged in the case of the ECU 4.

The gas fuel engine has an intake stroke, a compression stroke, a combustion stroke, and an exhaust stroke, as in the same manner to the Otto cycle engine or the Sabathe cycle engine. The gas fuel engine may be a two-cycle engine or a four-cycle engine.

The ECU 4 comprises a known microcomputer including a CPU, an input circuit, an output circuit, a power supply circuit, and a memory device (such as ROM, stand-by RAM, EEPROM, and RAM) for memorizing various programs and data.

The ECU 4 controls fuel injection of the injector 15 and the spark discharge of the spark plug 17 by respectively controlling the injector driving circuit 16 and the spark plug driving circuit 18 according to operating condition of the engine 1, and so on. Various signals from sensors, such as an NE sensor 21 for detecting a number of the engine rotation and a crank angle, and an accelerator position sensor 22 for detecting an accelerator opening, are inputted into the ECU 4 in order to detect the operating condition. In the first embodiment, though a load of the engine 4 is detected according to the accelerator opening, the engine load may be,detected based on an amount of the fuel injection calculated by the ECU 4.

The ECU 4 has, as a control program for the injector 15, an injection pattern decision means for deciding an injection pattern for each injection timing based on the sensor signals (a current operating condition) read in the RAM and a program memorized in the ROM. The ECU 4 further has a target injection amount calculation means for calculating a target injection amount for each injection, and a target injection start timing calculation means for calculating a target start timing of the injection for each injection.

The injection pattern decision means is a control program to decide the injection pattern of the injector 15 according to the current operating condition. More specifically, it decides an injection pattern of only a first injection (a light load injection pattern) or an injection pattern combining the first injection with a second injection (a middle or high load injection pattern), in accordance with the current operating condition.

The target injection amount calculation means is a control program to calculate the target injection amount according to the current operating condition and a current supply period for the injector 15 in order to obtain the target injection amount. More specifically, it calculates an injection amount of the first injection to produce an air-fuel mixture of a local excess air factor $\lambda$ not less than 2. Then, it calculates a current supply period for the injector 15 in order to achieve the injection amount of the first injection. In case of executing the second injection, the program calculates an injection amount of the second injection to produce an air-fuel mixture of a local excess air factor $\lambda$ less than or equal to 1.1, in accordance with the current operating condition. Then, the program calculates a current supply period for the injector 15 in order to achieve the injection amount of the second injection.

The target injection start timing calculation means is a control program to calculate the target injection start timing according to the current operating condition and calculate a current supply start timing in order to start the fuel injection at the target injection start timing. More specifically, the program calculates the injection start timing of the first injection according to both of the number of the engine rotation and load of the engine, and calculates the current supply start timing to make the injector 15 inject the fuel at the injection start timing of the first injection. In case of executing the second injection, like the first injection, it calculates an injection start timing of the second injection, and calculates a current supply start timing to make the injector 15 start the fuel injection at the injection start timing of the second injection. A further detailed explanation of the control program will be made later.

The ECU 4 has, as a control program for the spark plug 17, a spark timing decision means for deciding a spark timing of the spark plug 17 for each combustion based on both of a program memorized in the ROM and sensor signals (the current operating condition) read in the RAM.

The spark timing of the spark plug 17 is a combustion start timing of a first combustion period. The spark timing decision means is also a means for deciding the combustion start timing of the first combustion period.

It is an important issue for the gas fuel engine to reduce production of NOx.

Figure 2:
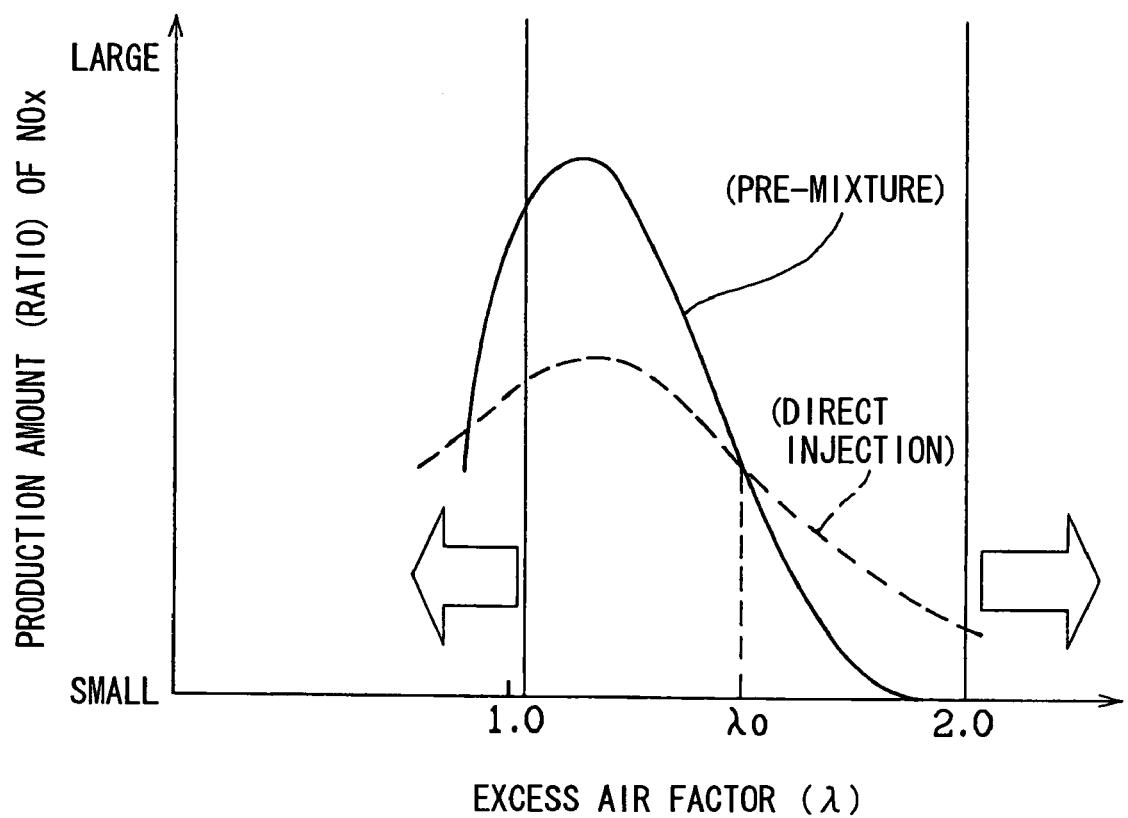
FIG. 2 is a characteristic graph showing relation between excess air factor and amount of NOx production.

As shown in FIG. 2, the NOx production largely depends on the excess air factor $\lambda$. Almost no NOx is produced by making the excess air factor $\lambda$ not less than 2. However, it is not possible to operate the engine, in all of a wide operating range, only by such combustion, which is carried out by the air-fuel mixture of the excess air factor $\lambda$ not less than 2, because a large engine torque cannot be obtained only by the combustion performed with such excess air factor $\lambda$.

On the other hand, as shown in FIG. 2, a production amount of NOx can be suppressed to a smaller amount in a range of the excess air factor $\lambda$ less than or equal to 1.1.

According to this fact, it may be considered that the engine would be operated with only the air-fuel mixture of the excess air factor $\lambda$ less than 1.1. However, the production amount of NOx by the combustion in the range of the excess air factor $\lambda$ less than or equal to 1.1, is larger than the production amount of NOx by the combustion in the range of the excess air factor $\lambda$ not less than 2. It is, therefore, a problem that the production amount of NOx is increased, if the combustion is always carried out with the air-fuel mixture of the excess air factor $\lambda$ less than or equal to 1.1. Further, the excess air factor $\lambda$ may possibly become less than 1.0, and thereby unburned gas may be generated.

According to the gas fuel engine of the first embodiment, during one cycle of the combustion stroke, the air-fuel mixture is burned in the low NOx production range of a lean side, in which the production amount of NOx is small and the excess air factor $\lambda$ is large, and then, the combustion of the air-fuel mixture is switched to a combustion in the low NOx production range of a rich side, in which the production amount of NOx is small and the excess air factor $\lambda$ is small, so that the production amount of NOx is suppressed to the small amount.

More specifically, during one cycle of the combustion stroke, the air-fuel mixture is burned in such a manner that the local excess air factor $\lambda$ is controlled to be not less than 2, and in the middle of one cycle of the combustion stroke, the combustion of the air-fuel mixture is switched to such a combustion, in which the local excess air factor $\lambda$ is controlled to be less than or equal to 1.1. The production amount of NOx is thereby reduced.

In the gas fuel engine of the first embodiment, an operation of the lean combustion and an operation of a rich combustion can be switched to each other. The operation of the lean combustion is performed when the engine load is light, wherein the air-fuel mixture is burned only in the low NOx production range of the lean side. The operation of the lean-rich combustion is performed when the engine load is middle or high, wherein the air-fuel mixture is burned in the low NOx production ranges of the lean side and the rich side.

Namely, the air-fuel mixture is burned at first in the low NOx production range of the lean side, and then the combustion is changed to the combustion in which the air-fuel mixture is burned in the low NOx production range of the rich side, during one cycle of the combustion stroke.

More specifically, when the engine load is light, the air-fuel mixture of the local excess air factor $\lambda$ not less than 2 is combusted (the lean combustion), during one combustion stroke. When the engine load is middle or high, the air-fuel mixture of the local excess air factor $\lambda$ not less than 2 is combusted at first, and in the middle of one cycle of the combustion stroke, the local excess air factor $\lambda$ is switched from 2 to a value of less than or equal to 1.1 (the lean-rich combustion).

When the target torque is sufficiently given by only the combustion in the first combustion period, the combustion is performed by only the air-fuel mixture of the local excess air factor $\lambda$ not less than 2. On the other hand, when the target torque is not sufficiently given by only the first combustion period, the combustion is performed by the air-fuel mixture of the local excess air factor $\lambda$ not less than 2, and then, the combustion is continued with the air-fuel mixture, by switching the local excess air factor $\lambda$ from 2 to the value less than or equal to 1.1, in the middle of one cycle of the combustion stroke.

In this specification, the combustion period in the low NOx production range of the lean side, in which the local excess air factor $\lambda$ is not less than 2, is referred to as the first combustion period. The combustion period in the low NOx production range of the rich side, in which the local excess air factor $\lambda$ is less than or equal to 1.1, is referred to as the second combustion period.

Figure 3A:
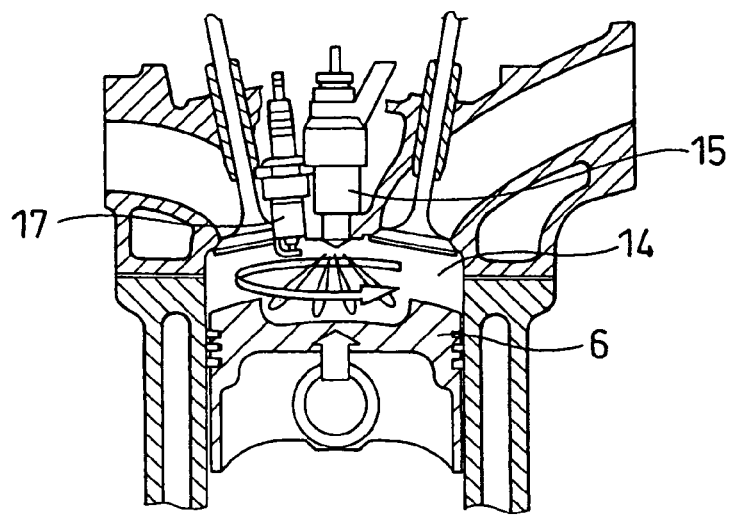
FIGS. 3A to 3C are schematic views respectively showing an operational condition according to the first embodiment.
Figure 4:
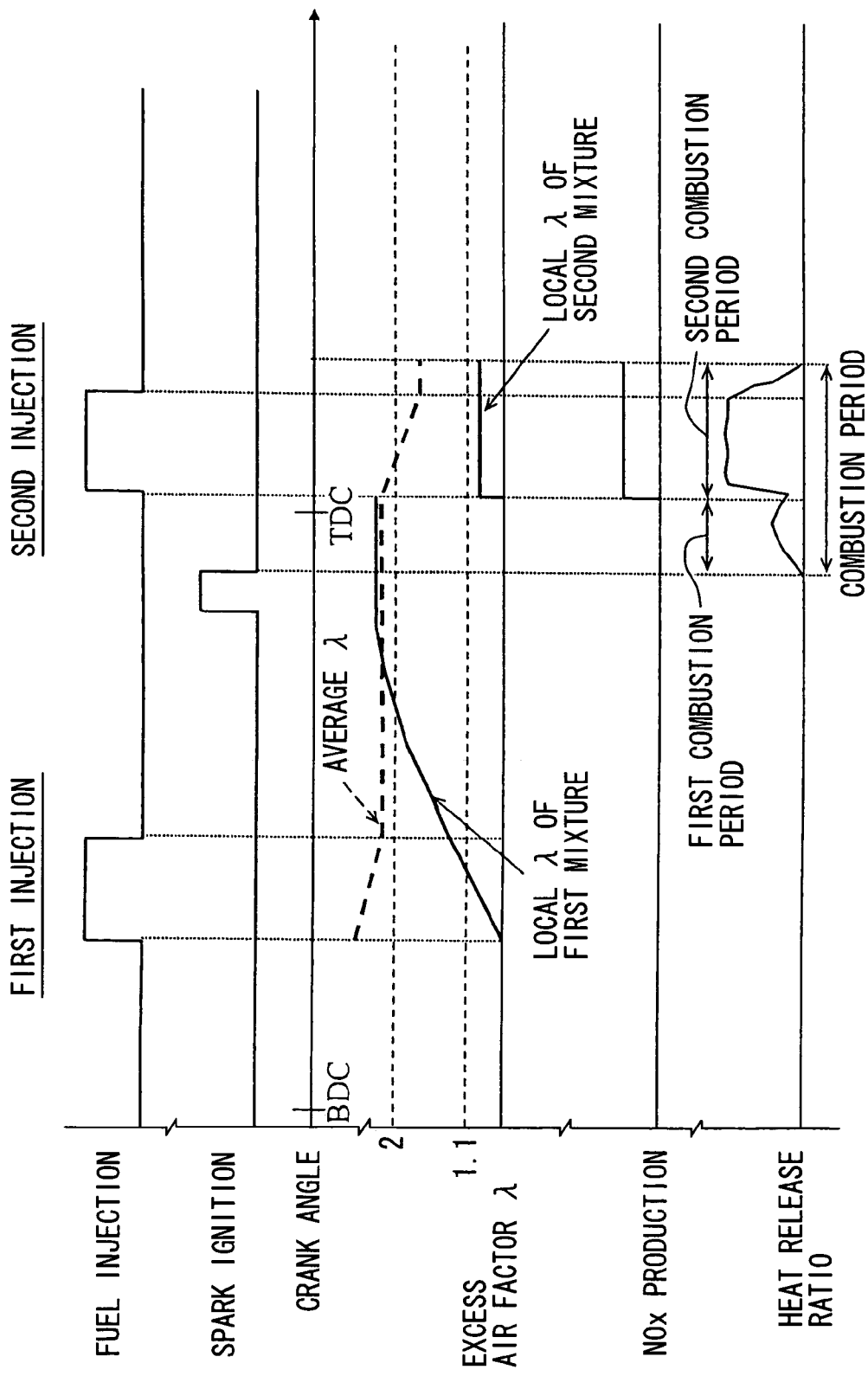
FIG. 4 is a time chart showing an operation according to the first embodiment.
Figure 5:
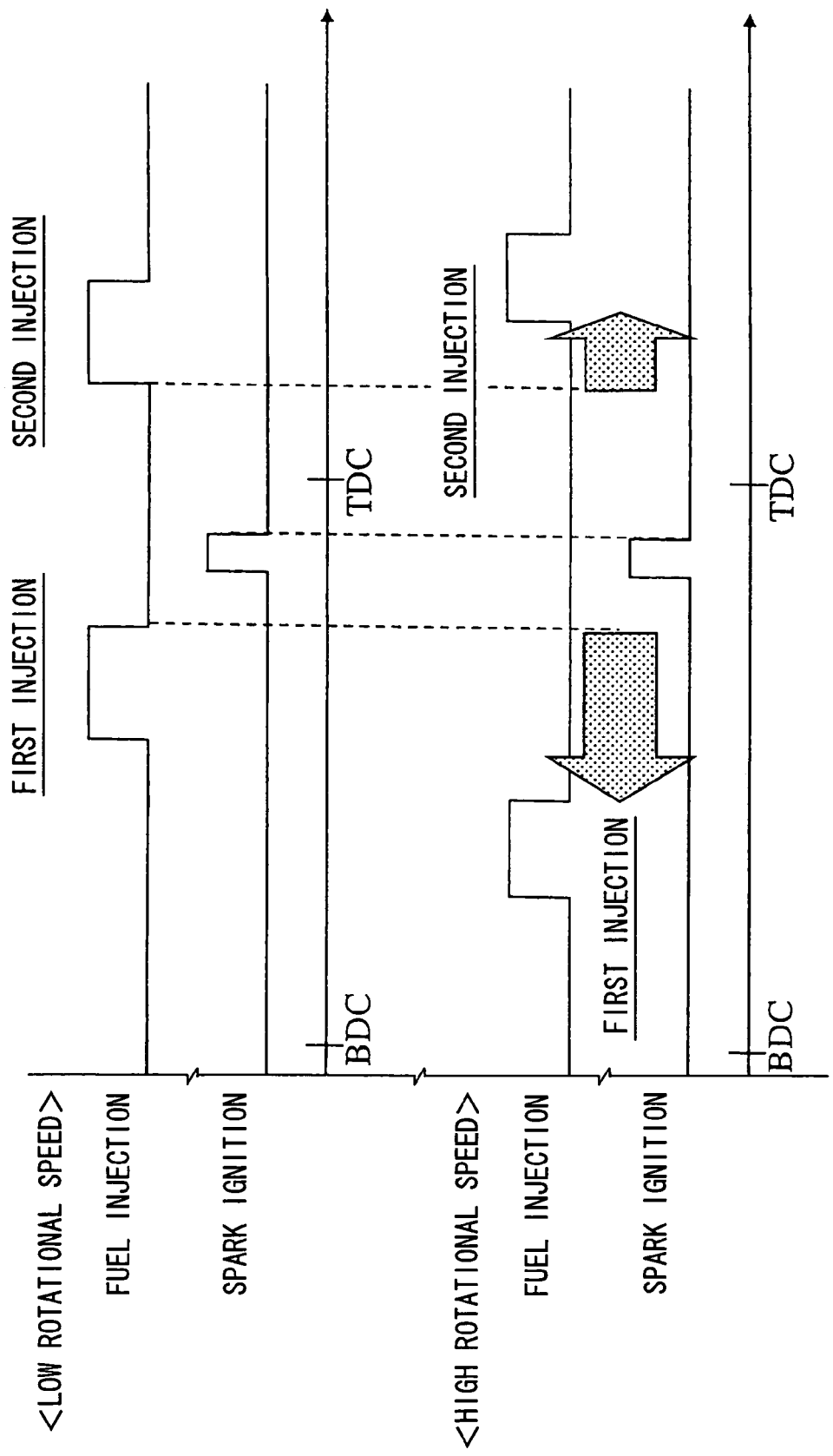
FIG. 5 is a time chart showing a change of an injection timing according to the number of engine rotation.

In the first combustion period, as shown in FIG. 3A and FIG. 4, the injected fuel is mixed with the air after the fuel is injected by the injector 15 (the first injection).

Figure 3B:
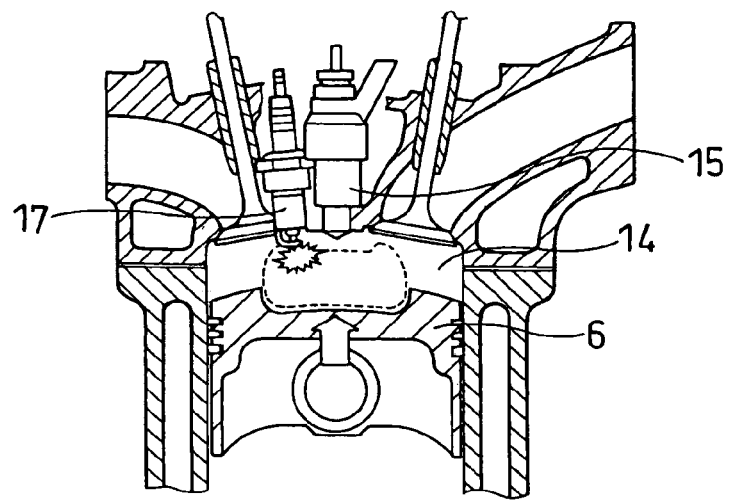
Figure 12B:
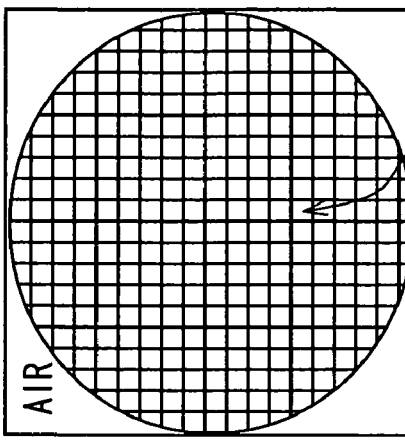
FIGS. 12A and 12B are schematic views respectively showing local excess air factor and average excess air factor.
Figure 12A:
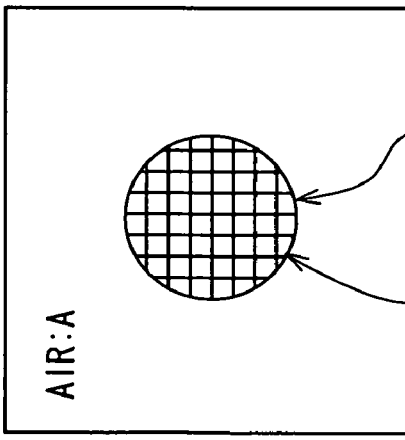

Then, the air-fuel mixture is ignited when the local excess air factor $\lambda$ near the spark discharge portion of the spark plug 17 becomes not less than 2, so that the first combustion period starts, as shown in FIG. 3B, FIG. 4 and FIG. 12A. In this first combustion period, almost no NOx is produced because the air-fuel mixture of the local excess air factor $\lambda$ not less than 2 is burned.

Figure 3C:
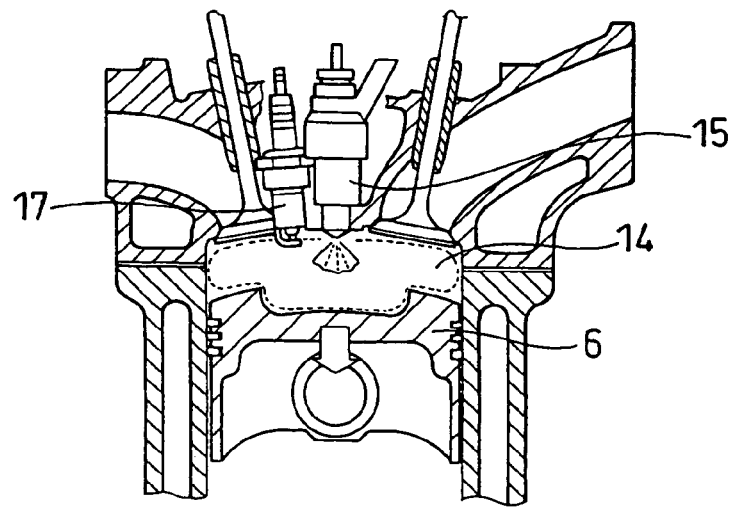

In the second combustion period, the fuel is directly injected into the flame generated in the first combustion period (the second injection), as shown in FIG. 3C, FIG. 4 and FIG. 12B, so that the second combustion period starts. In this second combustion period, the production amount of NOx can be suppressed to a small value, because the air-fuel mixture of the local excess air factor $\lambda$ less than or equal to 1.1 is burned.

In the first combustion period, a certain time (a fuel diffusion time), from the first injection to the sparking timing, is necessary for the injected fuel for diffusing into the air to form the air-fuel mixture of the local excess air factor $\lambda$ becomes not less than 2. The injection timing of the first injection is retarded with respect to the spark timing (the start timing of the first combustion period), as shown in an upper portion of FIG. 5, as the number of the engine rotation becomes smaller, so that the fuel diffusion time may be secured. On the other hand, as the number of the engine rotation becomes larger, the injection timing of the first injection is advanced with respect to the spark timing, as shown in a lower portion of FIG. 5.

As above, the necessary time for the fuel diffusion can be secured in order that the air-fuel mixture of the local excess air factor $\lambda$ not less than 2 is formed, even if the number of the engine rotation is varied.

The second combustion period is preferably started from the end of the first combustion period. As the number of the engine rotation becomes smaller, the injection timing of the second injection is advanced with respect to the spark timing, as shown in the upper portion of FIG. 5. On the other hand, as the number of the engine rotation becomes larger, the injection timing of the second injection is retarded with respect to the spark timing, as shown in the lower portion of FIG. 5.

According to the above control, the combustion of the second injection period can be started from the timing adjacent to the end of the first combustion period, even if the number of the engine rotation varies. Accordingly, the injection start timing for the first injection and the second injection is controlled in such a manner that a crank angle interval between the first injection and the second injection becomes shorter as the number of the engine rotation becomes larger, whereas the interval becomes longer as the number of the engine rotation becomes smaller.

The generated engine torque strongly depends on the combustion of the second combustion period. As the engine load is increased, the fuel injection amount of the second injection is increased, so that the second combustion period can be controlled to be longer. In this control, an end of the second combustion period is required to be controlled at a constant time point (at a predetermined crank angle) in order to efficiently transmit the combustion energy to the crankshaft.

Figure 6:
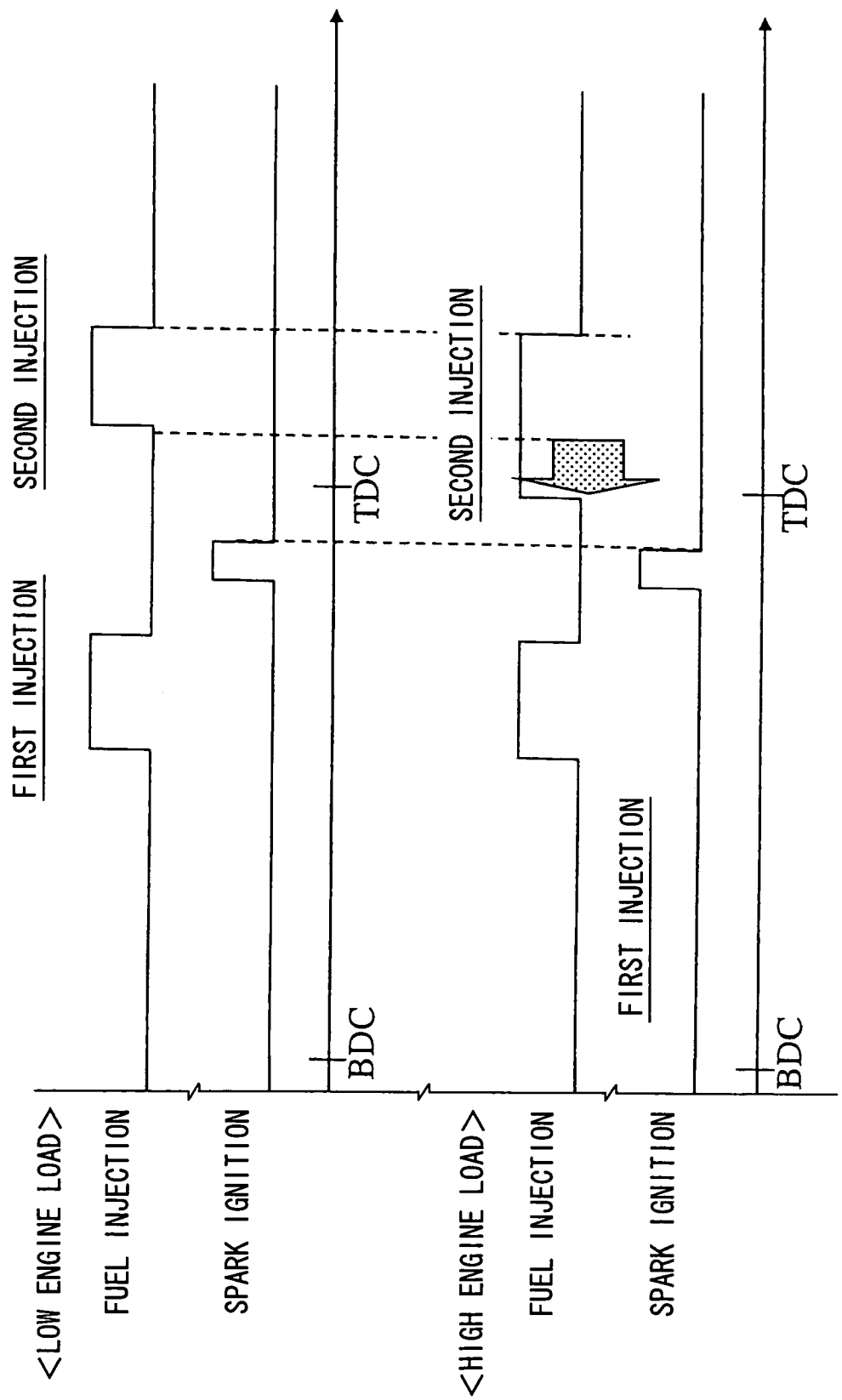
FIG. 6 is a time chart showing a change of an injection timing according to load of the engine.

To the end, the injection timing of the second injection is retarded, as shown in an upper portion of FIG. 6, as the engine load becomes smaller. On the other hand, as the engine load becomes larger, the injection timing of the second injection is advanced, as shown in a lower portion of FIG. 6. According to the above control of the injection start timing of the second injection, the end of the second combustion period can be controlled at the desired time point, even if the injection period of the second injection is varied by fluctuation the engine load.

The above control for the injection start timing of the first injection and the second injection with respect to the engine rotational speed, and the control for the injection start timing of the second injection with respect to the engine load are carried out in combination with each other, and the injection start timing of the first and second injections are controlled by the map and arithmetic expression memorized in the ECU 4 according to the engine rotational speed as well as the engine load.

According to the gas fuel engine of the first embodiment, when the target torque is sufficiently given by only the combustion in the first combustion period, the combustion is carried out only by the air fuel mixture of the local excess air factor $\lambda$ not less than 2. Therefore, the production amount of NOx can be suppressed to a small amount, because almost no NOx is produced in the first combustion period, in which the local excess air factor $\lambda$ of the (first) air-fuel mixture is not less than 2.

Also, when the target torque is not sufficiently given by only the combustion in the first combustion period, the combustion is carried out by the first air-fuel mixture in the first combustion period, in which the local excess air factor $\lambda$ is not less than 2, and then, the combustion is switched to the second combustion in the middle of the first combustion period, so that the combustion is carried out in the second combustion period by the second air-fuel mixture of the local excess air factor $\lambda$ less than or equal to 1.1.

Even if the target torque is increased, the air-fuel mixture is burned in the first combustion period, in which almost no NOx is produced, and in the second combustion period, in which the production amount of NOx can be suppressed. As a result, the production amount of NOx can be reduced to its minimum value.

Therefore, according to the gas fuel engine of the first embodiment, the excess air factor $\lambda$ can be optimized and the NOx production can be sufficiently reduced.

Second Embodiment

Figure 7:
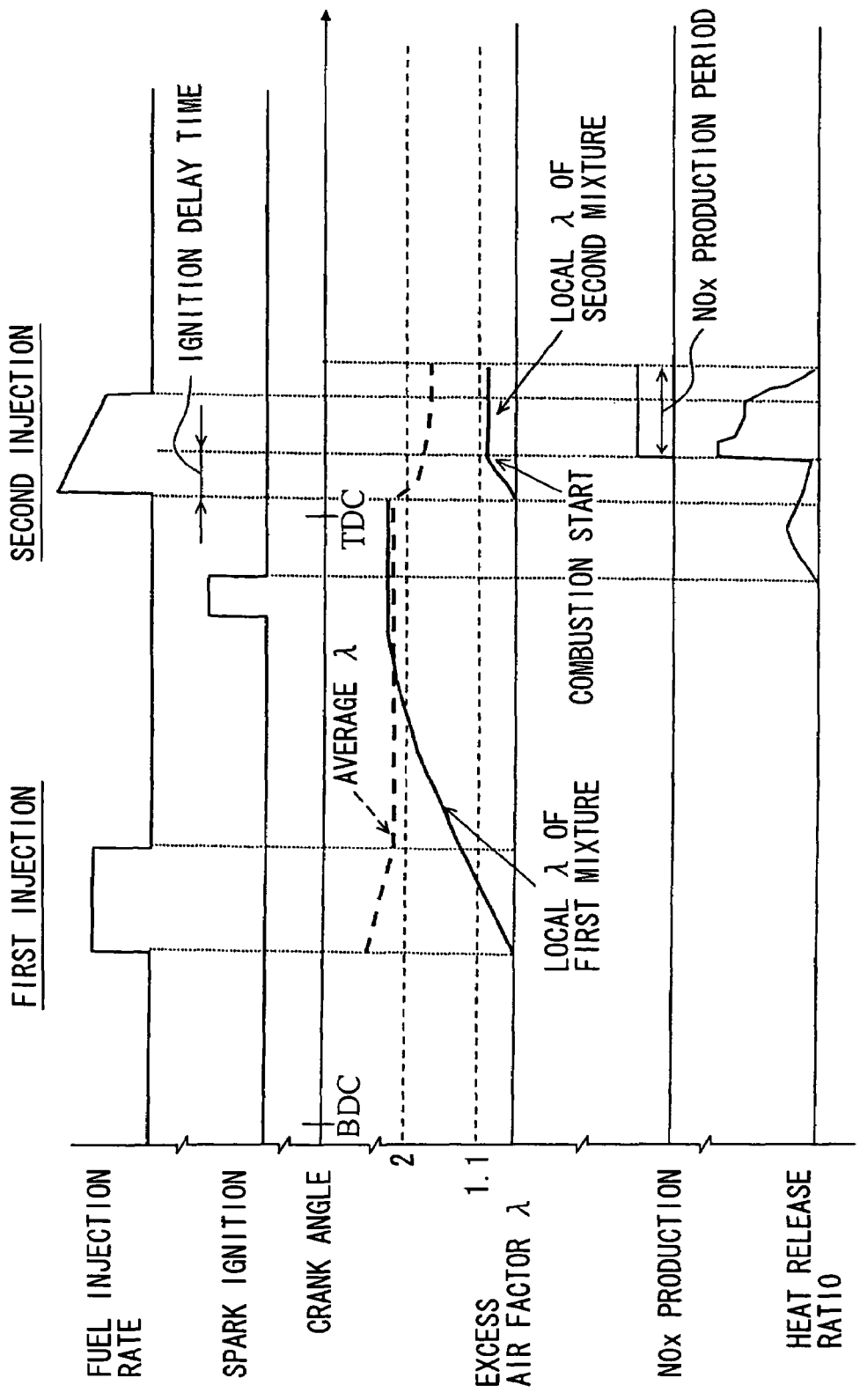
FIG. 7 is a time chart showing an operation according to a second embodiment.

A second embodiment of the present invention will be explained with reference to FIG. 7.

In the gas fuel engine of the second embodiment, a fuel injection rate is increased at an initial stage of the second injection. Namely, the fuel injection rate at the initial stage is made larger than that at the end of the second injection, as the case may be, larger than that in the first injection.

According to such control, it takes a longer time until fuel and air are mixed after the injection and the mixed gas becomes a combustible mixture. As a result, a time delay between the fuel injection and the actual start of the combustion would become longer, and thereby the combustion period for the second combustion (namely, the period for NOx production) can be reduced. Therefore, the NOx production can be suppressed.

Third Embodiment

Figure 8:
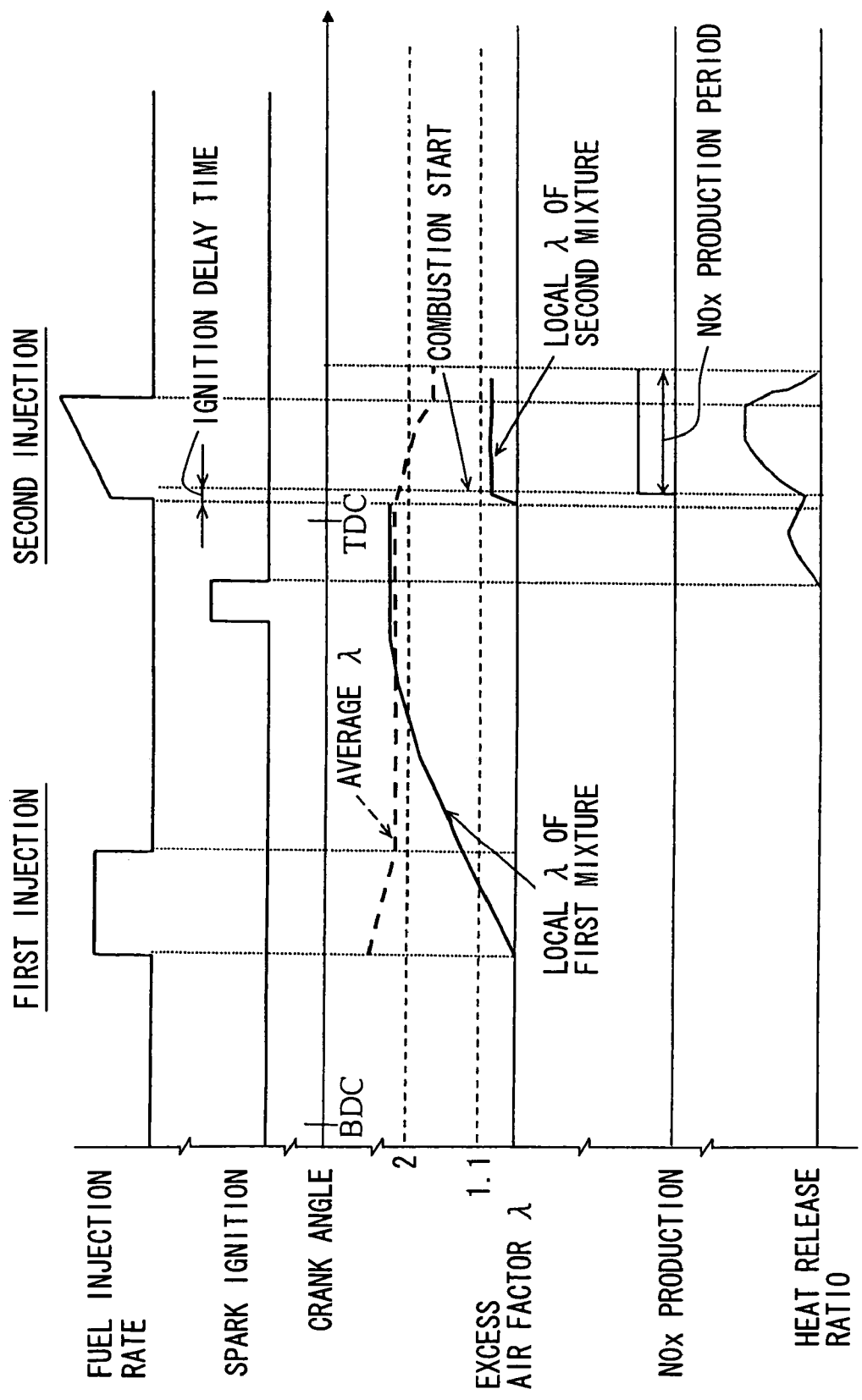
FIG. 8 is a time chart showing an operation according to a third embodiment.

A third embodiment of the present invention will be explained with reference to FIG. 8.

In the gas fuel engine of the third embodiment, a fuel injection rate is decreased at the initial stage of the second injection period. Namely, the fuel injection rate at the initial stage is made smaller than that at the end of the second injection, and as the case may be, smaller than that in the first injection.

According to the above control, the fuel and air are easily mixed after the injection, so that the time delay between the fuel injection and the actual start of the combustion becomes shorter, and thereby the combustion period for the second combustion (namely, the period for NOx production) is increased. However, a rapid combustion can be suppressed (a gradual heat release is realized), so that generation of vibration and noise of the engine can be restricted.

Fourth Embodiment

Figure 9:
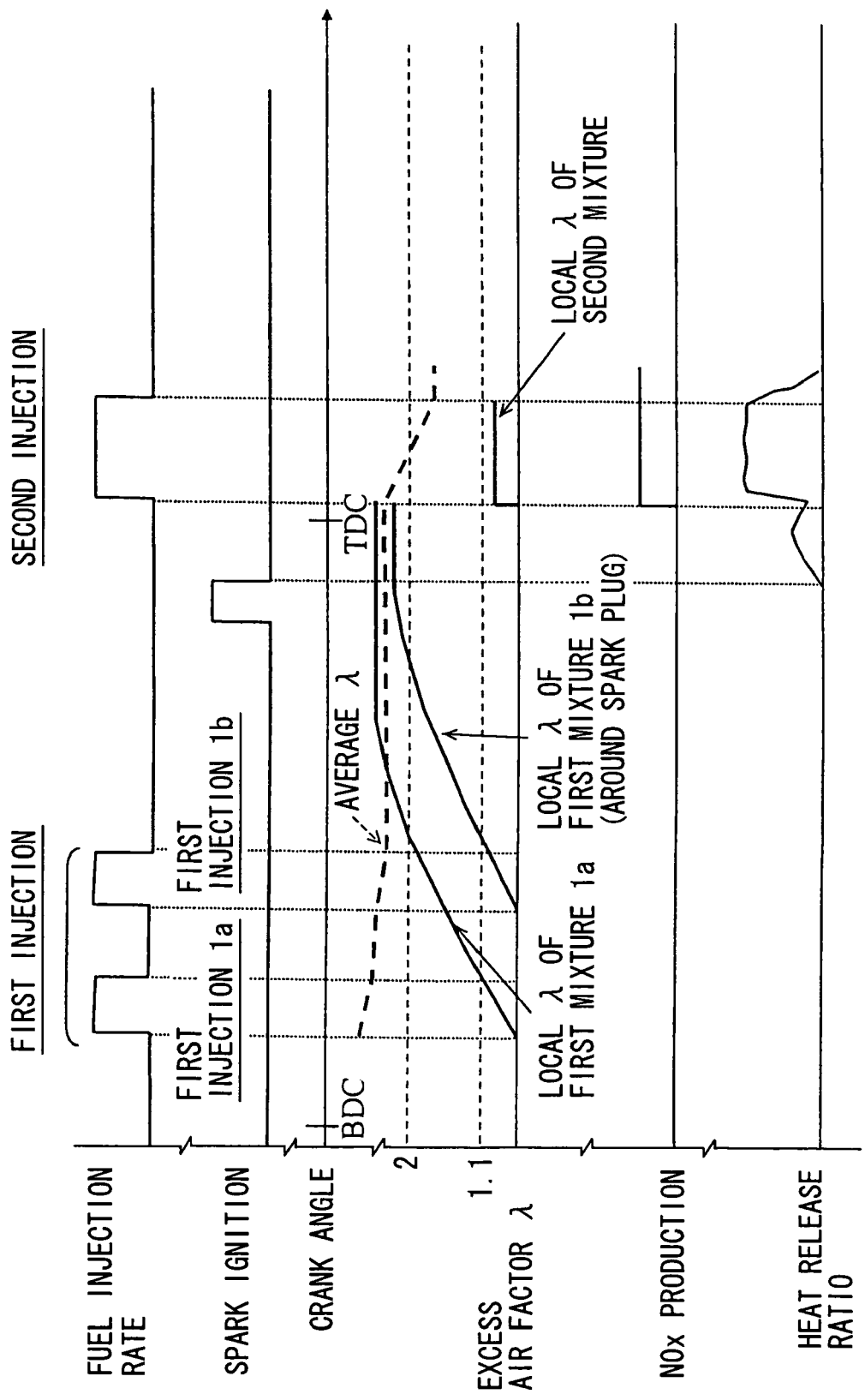
FIG. 9 is a time chart showing an operation according to a fourth embodiment.

A fourth embodiment of the present invention will be explained with reference to FIG. 9.

When the amount of fuel necessary amount for the first injection is relatively small, the local excess air factor $\lambda$ becomes larger, for example larger than 5, as a result of the fuel diffusion into an entire space of the combustion chamber 14. Stabilities for the spark ignition as well as the combustion of the mixture may be deteriorated.

According to the fourth embodiment, therefore, the fuel for the first injection is injected by multiple injections, in the case that the amount of fuel necessary for the first injection is relatively small. Then, the injected fuel is prevented from diffusing into a larger space of the combustion chamber 14 and thereby the local excess air factor $\lambda$ of the air-fuel mixture in a fuel injection area of the injector 15 (namely, the area around and adjacent to the spark discharge portion of the spark plug 17) is controlled at an optimum range ($2 > \lambda < 5$). The stabilities for the spark ignition as well as the combustion of the mixture can be secured.

Since the operation for spark ignition as well as the combustion of the air-fuel mixture can be stabilized, as above, by the multiple fuel injections, the reduction of the NOx production can be realized, even if the amount of fuel necessary for the first injection is small.

Fifth Embodiment

A fifth embodiment of the present invention will be explained with reference to FIG. 10 and FIG. 11.

In the gas fuel engine of the above embodiments, the first injection and the second injection are carried out by one injector 15, which directly injects the fuel into the combustion chamber 14.

However, in a case of such an engine which is rotated at a high speed, or in a case of an engine in which an injector 15 having a poor characteristic for forming a mixture of fuel and air is used, a sufficient time for forming the air-fuel mixture may not be secured between the first fuel injection and the spark ignition.

According to the fifth embodiment, a first injector 15a for the first injection is provided at an upstream side of the combustion chamber 14, in addition to a second injector 15b for the second injection for directly injecting the fuel into the combustion chamber 14, for the purpose of increasing a characteristic for forming the mixture during a period from the fuel injection to the spark ignition. A numeral 16a designates a first injector driving circuit for supplying the electric power to the first injector 15a, whereas a numeral 16b designates a second injector driving circuit for supplying the electric power to the second injector 15b. The second injector 15b and the second injector driving circuit 16b are the same to the injector 15 and the injector driving circuit 16 described in the first embodiment.

Figure 10:
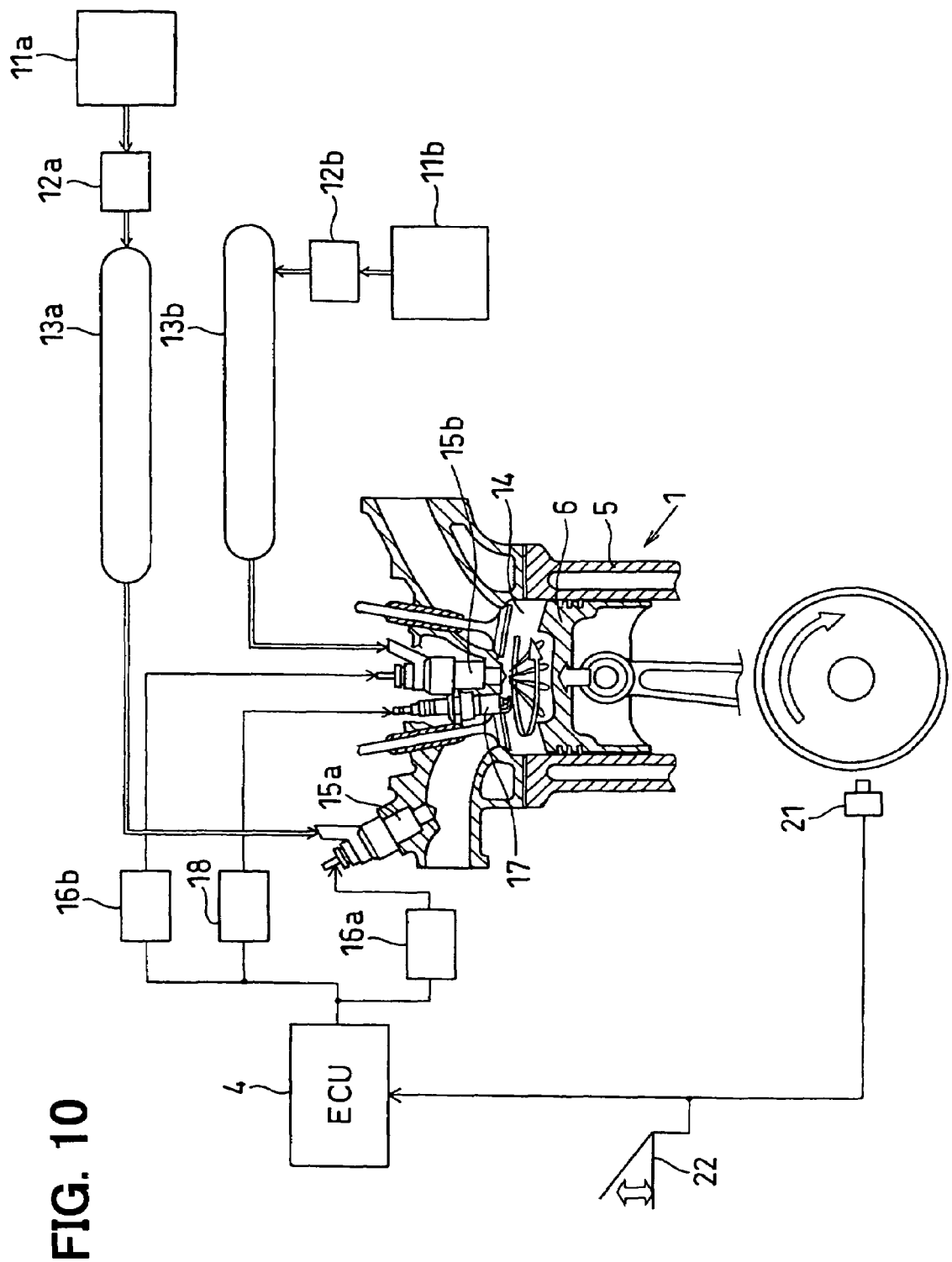
FIG. 10 is a schematic view showing a gas fuel engine according to a fifth embodiment.

The first injector 15a shown in FIG. 10 injects the fuel toward an intake port of the cylinder head 7. However, the first injector 15a may inject the fuel in an intake manifold or in an intake pipe upstream of the intake manifold, depending on the respective designs of the engine.

A distance and time from the fuel injection and the spark ignition are elongated by the above arrangement, namely by providing the first injector 15a for the first injection at the upstream side of the combustion chamber 14. The characteristic for forming the mixture of fuel and air can be increased, even in the case of the engine running at the high rotational speed, or in the case that the injector having the poor characteristic for forming the mixture is used.

Figure 11:
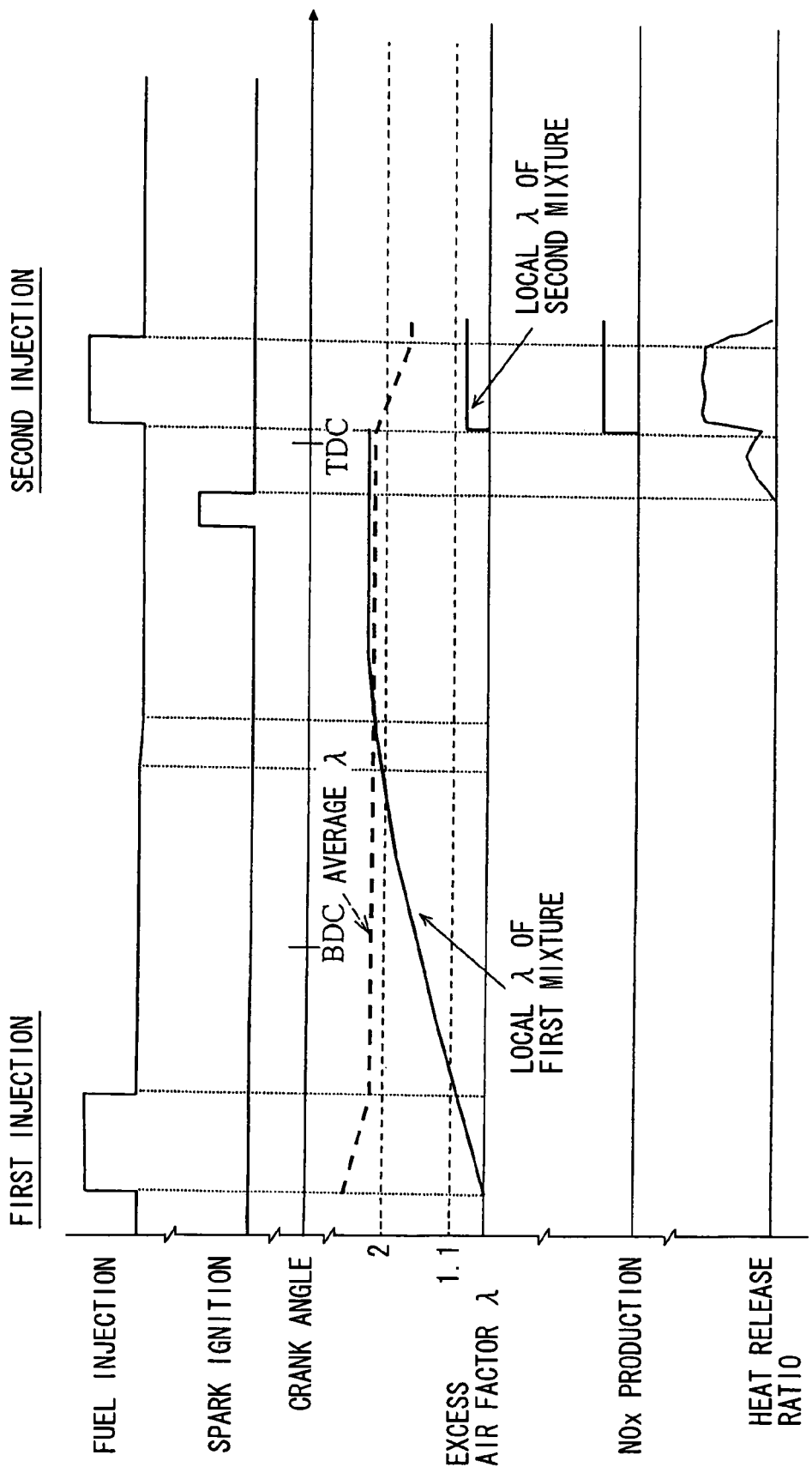
FIG. 11 is a time chart showing an operation according to the fifth embodiment.

As shown in FIG. 11, the first injection timing is more advanced than the spark timing, because the first injector 15a is arranged at the upstream of the combustion chamber 14.

A fuel pressure to be supplied to the first injector 15a can be lower than that for the second injector 15b, because the first injector 15a is not the direct fuel injection type injector.

Accordingly, as shown in FIG. 10, a first high pressure accumulator 11a, a first pressure regulating device 12a, and a first fuel accumulating chamber 13a, which supply the lower pressure fuel to the first injector 15a, may be arranged separately from a second high pressure accumulator 11b, a second pressure regulating device 12b, and a second fuel accumulating chamber 13b (those are the same to the components 11, 12, and 13 in FIG. 1), which supply the higher pressure fuel to the second injector 15b.

(Modification)

In the above embodiments, the excess air factor λ is explained as being not less than 2, for the air-fuel mixture in the low NOx production range of the lean side. However, the excess air factor λ shall not be limited to such an amount not less than 2, but any other excess air factor λ can be used for the present invention, for example the excess air factor λ more than 1.95, so long as the air-fuel mixture is combustible and has a higher excess air factor λ, with which a lower amount of NOx production can be realized.

On the other hand, the excess air factor λ is explained in the above embodiments as being less than 1.1, for the air-fuel mixture in the low NOx production range of the rich side. However, the excess air factor λ shall not be limited to such an amount less than 1.1, but any other excess air factor λ can be used for the present invention, for example the excess air factor λ less than 1.15, so long as the air-fuel mixture is combustible and has a lower excess air factor λ, with which a lower amount of NOx production can be realized.

What is claimed is:

1. A gas fuel engine operating with gas fuel, comprising:
a combustion chamber formed by a cylinder and a piston;
an injector for injecting fuel to form an air-fuel mixture in the combustion chamber;
a spark plug provided at a cylinder head for igniting the air-fuel mixture; and
a control unit for controlling an amount of fuel to be injected by the injector,
wherein the fuel is injected by the injector twice for each combustion stroke,
a first injection of the fuel is performed in a first combustion period to form a first air-fuel mixture having a local excess air factor not less than 2,
a second injection of the fuel is performed in a second combustion period to form a second air-fuel mixture having a local excess air factor less than 1.1,
the first injection is switched to the second injection during one cycle of the combustion stroke, and
an interval of a crank angle, during which the fuel is not injected by the injector between the first and second injections, is controlled such that the interval becomes shorter as an engine rotational speed becomes higher.

2. The gas fuel engine according to claim 1, wherein
the fuel is injected by the injector directly or indirectly into the combustion chamber, and
the first air-fuel mixture is ignited by the spark plug at such a timing to start the combustion, at which the first air-fuel mixture is formed by the fuel injected in the first injection the air supplied into the combustion chamber and the local excess air factor becomes not less than 2.

3. The gas fuel engine according to claim 1, wherein
the fuel is injected by the injector directly into the combustion chamber, and
the second combustion period is started by injecting the fuel by the injector directly into a flame generated in the first combustion period.

4. A gas fuel engine operating with gas fuel, comprising:
a combustion chamber formed by a cylinder and a piston;
an injector for injecting fuel to form an air-fuel mixture in the combustion chamber;
a spark plug provided at a cylinder head for igniting the air-fuel mixture; and
a control unit for controlling an amount of fuel to be injected by the injector,
wherein the fuel is injected by the injector twice for each combustion stroke, a first infection of the fuel is performed in a first combustion period to form a first air-fuel mixture having a local excess air factor not less than 2,
a second injection of the fuel is performed in a second combustion period to form a second air-fuel mixture having a local excess air factor less than 1.1,
the first infection is switched to the second injection during one cycle of the combustion stroke, and
an injection start timing for the second injection is controlled such that the injection start timing is advanced as an engine load becomes higher.

5. A gas fuel engine operating with gas fuel, comprising:
a combustion chamber formed by a cylinder and a piston:
an injector for injecting fuel to form an air-fuel mixture in the combustion chamber:
a spark plug provided at a cylinder head for igniting the air-fuel mixture; and
a control unit for controlling an amount of fuel to be injected by the injector,
wherein the fuel is injected by the injector twice for each combustion stroke,
a first injection of the fuel is performed in a first combustion period to form a first air-fuel mixture having a local excess air factor not less than 2,
a second injection of the fuel is performed in a second combustion period to form a second air-fuel mixture having a local excess air factor less than 1.1,
the first injection is switched to the second injection during one cycle of the combustion stroke, and
a fuel injection rate for the second injection is controlled such that the injection rate at an initial stage of the second injection is made larger than that at the end of the second injection.

6. A gas fuel engine operating with gas fuel, comprising:
a combustion chamber formed by a cylinder and a piston;
an injector for injecting fuel to form an air-fuel mixture in the combustion chamber;
a spark plug provided at a cylinder head for igniting the air-fuel mixture; and
a control unit for controlling an amount of fuel to be injected by the injector,
wherein the fuel is injected by the injector twice for each combustion stroke.
a first infection of the fuel is performed in a first combustion period to form a first air-fuel mixture having a local excess air factor not less than 9
a second injection of the fuel is performed in a second combustion period to form a second air-fuel mixture having a local excess air factor less than 1.1,
the first injection is switched to the second injection during one cycle of the combustion stroke, and
a fuel injection rate for the second injection is controlled such that the injection rate at an initial stage of the second injection is made smaller than that at the end of the second injection.

7. A gas fuel engine operating with gas fuel, comprising:
a combustion chamber formed by a cylinder and a piston;
an injector for injecting fuel to form an air-fuel mixture in the combustion chamber;
a spark plug provided at a cylinder head for igniting the air-fuel mixture; and
a control unit for controlling an amount of fuel to be injected by the injector,
wherein the fuel is injected by the injector twice for each combustion stroke,
a first injection of the fuel is carried out in a first combustion period so that a first combustion is performed in a low NOx production range of a lean side, in which air-fuel mixture having a higher local excess air factor is combusted and a smaller amount of NOx is produced,
a second injection of the fuel is carried out in a second combustion period so that a second combustion is performed in a low NOx production range of a rich side, in which air-fuel mixture having a lower local excess air factor is combusted and a smaller amount of NOx is produced,
the first combustion is switched to the second combustion during one cycle of the combustion stroke, and
an interval of a crank angle, during which the fuel is not injected by the injector between the first and second injections, is controlled such that the interval becomes shorter as an engine rotational speed becomes higher.

8. A gas fuel engine operating with gas fuel, comprising:
a combustion chamber formed by a cylinder and a piston;
an injector for directly injecting fuel into the combustion chamber to form an air-fuel mixture therein;
a spark plug provided at a cylinder head for igniting the air-fuel mixture; and
a control unit for controlling an amount of fuel to be injected by the injector,
wherein the fuel is injected by the injector twice for each combustion stroke,
a first injection of the fuel is carried out in a first combustion period so that a first combustion is performed in a low NOx production range of a lean side, in which air-fuel mixture having a higher local excess air factor is combusted and a smaller amount of NOx is produced,
a second injection of the fuel is carried out in a second combustion period so that a second combustion is performed in a low NOx production range of a rich side, in which air-fuel mixture having a lower local excess air factor is combusted and a smaller amount of NOx is produced,
the first combustion is switched to the second combustion during one cycle of the combustion stroke, and
an interval of a crank angle, during which the fuel is not injected by the injector between the first and second injections, is controlled such that the interval becomes shorter as an engine rotational speed becomes higher.

9. A gas fuel engine operating with gas fuel, comprising:
a combustion chamber formed by a cylinder and a piston;
a first injector provided at an intake pipe of the engine for injecting a first fuel in the intake pipe, the injected fuel being supplied into the combustion chamber to form a first air-fuel mixture therein;
a second injector provided at a cylinder head for directly injecting a second fuel into the combustion chamber to form a second air-fuel mixture therein;
a spark plug provided at the cylinder head for igniting the first air-fuel mixture; and
a control unit for controlling amounts of fuel to be respectively injected by the first and second injectors,
wherein the second fuel is injected by the injector in one combustion stroke after the first fuel,
a first injection of the first fuel is carried out in a first combustion period so that a first combustion is performed in a low NOx production range of a lean side, in which air-fuel mixture having a higher local excess air factor is combusted and a smaller amount of NOx is produced,
a second injection of the second fuel is carried out in a second combustion period so that a second combustion is performed in a low NOx production range of a rich side, in which air-fuel mixture having a lower local excess air factor is combusted and a smaller amount of NOx is produced, the first combustion is switched to the second combustion during one cycle of the combustion stroke, and an interval of a crank angle, during which the fuel is not injected by the injector between the first and second injections, is controlled such that the interval becomes shorter as an engine rotational speed becomes higher.

10. A control method for operating a gas fuel engine operating with gas fuel, which comprises:

a combustion chamber formed by a cylinder and a piston;

an injector for injecting fuel to form an air-fuel mixture in the combustion chamber;

a spark plug provided at a cylinder head for igniting the air-fuel mixture; and a control unit for controlling an amount of fuel to be injected by the injector, wherein the control method for operating the gas fuel engine comprises the steps of:

injecting a first fuel to form a first air-fuel mixture in the combustion chamber, the first air-fuel mixture having a local excess air factor larger than 2;

igniting the first air-fuel mixture by the spark plug so that a combustion of the first air-fuel mixture is performed in a first combustion period; and injecting a second fuel directly into the combustion chamber, the second air-fuel mixture having a local excess air factor less than 1.1, wherein the second injection is directly injected toward a flame generated by the combustion in the first combustion period so that a combustion of the second air-fuel mixture is performed in a second combustion period, wherein the first combustion is switched to the second combustion during one cycle of the combustion stroke, and an interval of a crank angle, during which the fuel is not injected by the injector between the first and second injections, is controlled such that the interval becomes shorter as an engine rotational speed becomes higher.

11. A control method for operating a gas fuel engine operating with gas fuel, which comprises:

a combustion chamber formed by a cylinder and a piston;

an injector for injecting fuel to form an air-fuel mixture in the combustion chamber;

a spark plug provided at a cylinder head for igniting the air-fuel mixture; and a control unit for controlling an amount of fuel to be injected by the injector, wherein the control method for operating the gas fuel engine comprises the steps of:

injecting a first fuel to form a first air-fuel mixture in the combustion chamber, the first air-fuel mixture having a local excess air factor larger than 2;

igniting the first air-fuel mixture by the spark plug so that a combustion of the first air-fuel mixture is performed in a first combustion period; and injecting a second fuel directly into the combustion chamber when an engine load becomes higher than a predetermined value, the second air-fuel mixture having a local excess air factor less than 1.1, wherein the second injection is directly injected toward a flame generated by the combustion in the first combustion period so that a combustion of the second air-fuel mixture is performed in a second combustion period, wherein the first combustion is switched to the second combustion during one cycle of the combustion stroke, and an interval of a crank angle, during which the fuel is not injected by the injector between the first and second injections, is controlled such that the interval becomes shorter as an engine rotational speed becomes higher.

* * * * *